(12) United States Patent
Readshaw

(10) Patent No.: US 8,572,691 B2
(45) Date of Patent: Oct. 29, 2013

(54) SELECTING A WEB SERVICE FROM A SERVICE REGISTRY BASED ON AUDIT AND COMPLIANCE QUALITIES

(75) Inventor: Neil Ian Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 1494 days.

(21) Appl. No.: 12/174,689

(22) Filed: Jul. 17, 2008

(65) Prior Publication Data

US 2010/0017853 A1    Jan. 21, 2010

(51) Int. Cl.
*G06F 7/04* (2006.01)
*G06F 15/16* (2006.01)

(52) U.S. Cl.
USPC ............................................................. 726/3

(58) Field of Classification Search
USPC ............................................................. 726/3
See application file for complete search history.

(56) References Cited

U.S. PATENT DOCUMENTS

| | | | |
|---|---|---|---|
| 6,697,944 B1 * | 2/2004 | Jones et al. | 713/168 |
| 7,444,522 B1 * | 10/2008 | Chang et al. | 713/189 |
| 2003/0145096 A1 * | 7/2003 | Breiter et al. | 709/231 |
| 2003/0204622 A1 | 10/2003 | Blizniak et al. | |
| 2005/0086197 A1 * | 4/2005 | Boubez et al. | 707/1 |
| 2006/0090206 A1 | 4/2006 | Ladner et al. | |
| 2006/0107036 A1 * | 5/2006 | Randle et al. | 713/153 |
| 2007/0162976 A1 * | 7/2007 | Anderson et al. | 726/25 |
| 2007/0169199 A1 | 7/2007 | Quinnell et al. | |
| 2008/0046550 A1 | 2/2008 | Mazur et al. | |
| 2009/0037994 A1 * | 2/2009 | Buss | 726/9 |
| 2009/0172776 A1 * | 7/2009 | Makagon et al. | 726/2 |
| 2010/0017853 A1 * | 1/2010 | Readshaw | 726/3 |

OTHER PUBLICATIONS

Karts., "An Investigation on Personalized Collaborative Filtering for Web Service Selecting", The University of Western Australia, 2005, pp. 1-63.
Reussner et al., "Audition of web Services for Testing Conformance to Open Specified Protocols", Architecture Systems, LNCS 3938, Springer-Verlag Berlin Heidelberg 2006, pp. 1-25.
Beek et al., "Web Service Composition Approaches: From Industrial Standards to Formal Methods", IEEE Second International Conference on Internet and Web Applications and Services, 2007, pp. 1-6.
Zhang., "Trustworthy Web Services: Actions for Now", IEEE Computer Society, Feb. 2005, pp. 32-36.

* cited by examiner

*Primary Examiner* — Peter Shaw
*Assistant Examiner* — Dao Ho
(74) *Attorney, Agent, or Firm* — Yee & Associates, P.C.; Yenn Tham

(57) ABSTRACT

A particular web service is selected based on conformation to a particular degree-of-trust. Information about available web services is requested. Responsive to requesting that information on the particular web service, a list of possible services is presented. The list of possible services includes a plurality of services, each of the plurality having a levels-of-trust assigned thereto. An acceptable web service having an acceptable degree-of-trust can then be selected from the list of possible services. Responsive to selecting the acceptable service from the list of possible services, the acceptable service can be invoked.

15 Claims, 3 Drawing Sheets

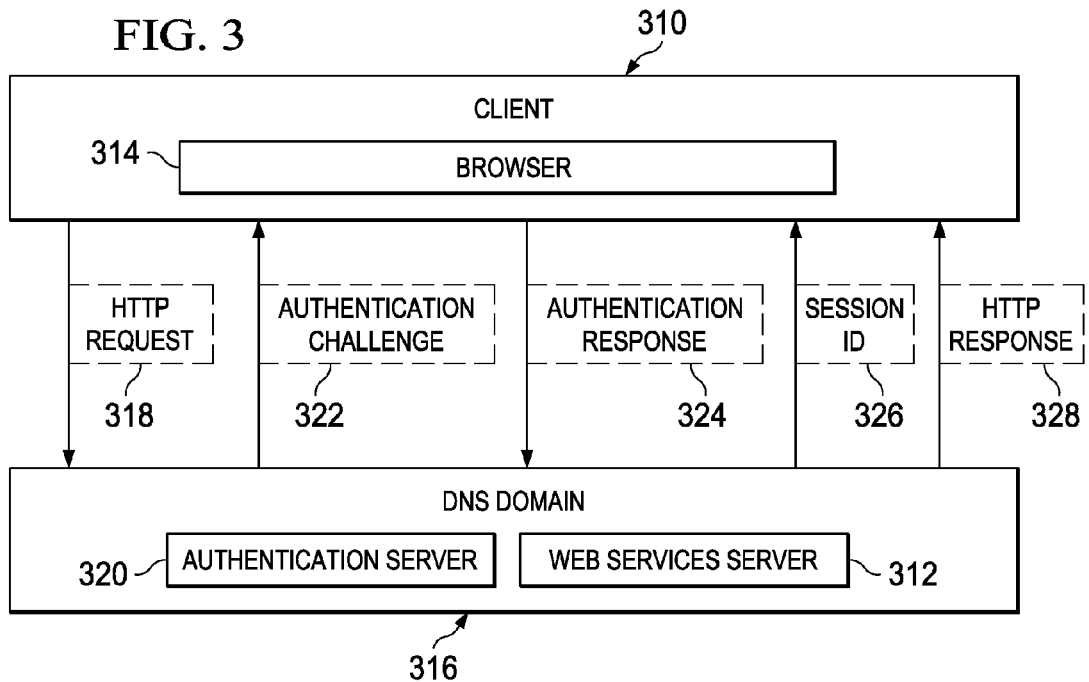
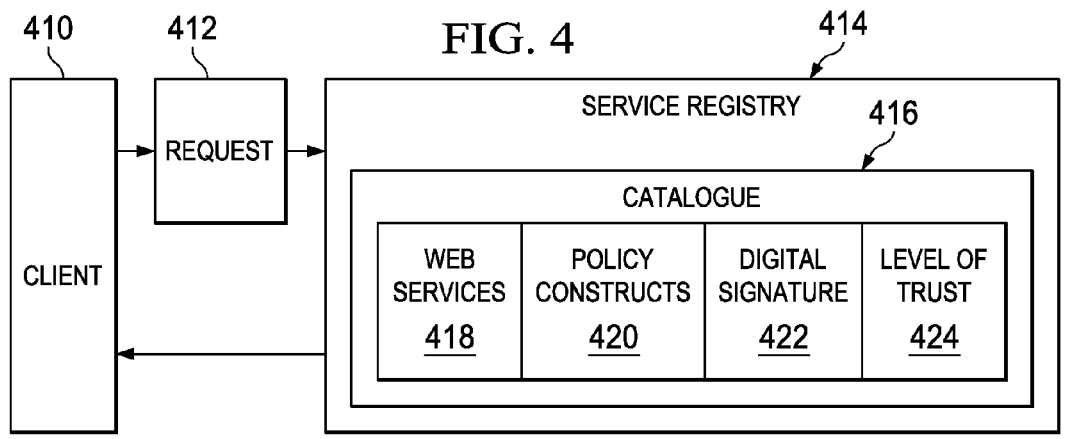

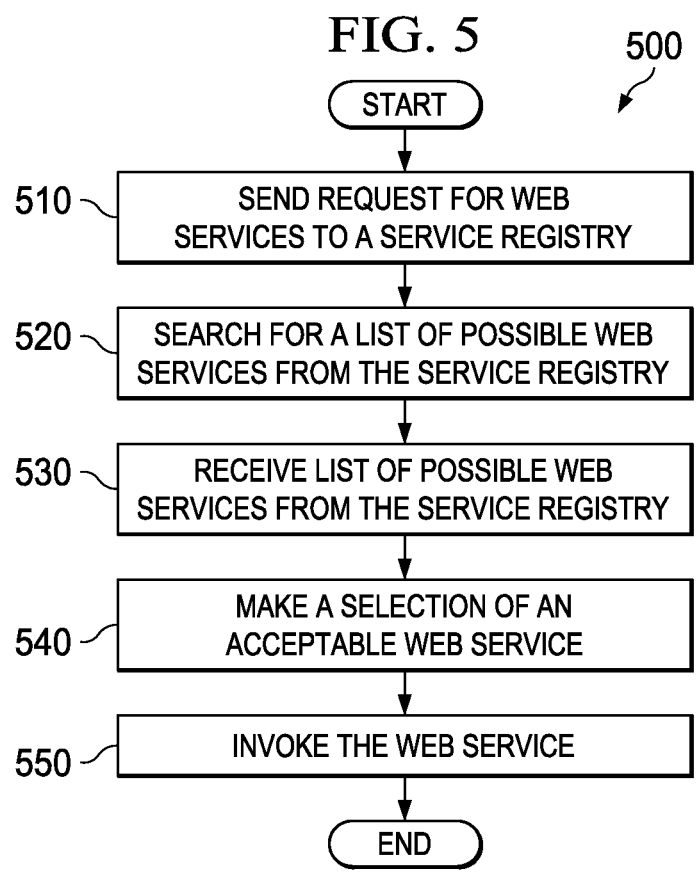

SELECTING A WEB SERVICE FROM A SERVICE REGISTRY BASED ON AUDIT AND COMPLIANCE QUALITIES

BACKGROUND OF THE INVENTION

1. Field of the Invention

The present application relates generally to a computer implemented method, a computer program product, and a data processing system. More specifically, the present invention relates to a computer implemented method, a computer program product, and a data processing system for selecting a web service from a service registry based on audit and compliance qualities.

2. Description of the Related Art

In the information security industry, audit is a fundamental component of any security solution. Audit creates a trail of security-focused events. Compliance is a processes for assessing a given security solution's conformance to a government, industry, or internal description of security directives, specifications or processes.

Collecting, storing and analyzing audit data is often part of a compliance program. A system or service will often implement such audit functions when determining compliance.

In a technical environment based on service oriented architecture, services are often catalogued in a service registry, such as WebSphere Service Registry and Repository, or a Universal Description Discovery and Integration (UDDI) directory. Service registries such as these allow service consumers to search for a service based on various attributes, and retrieve the service definition. The Web Services Definition Language, or WSDL, is a standard for describing the interface of a web service.

Having web service consumers aware of the specific audit and compliance attributes is becoming increasingly important. However, certain audit and compliance attributes might be more important to certain services, and service consumers than other audit and compliance attributes, such that providing a litany of these attributes might not be necessary or desirable for a specific application.

By way of example, a particular web service that is considered to be reputable may advertise comprehensive auditing. However, a certain user may wish to use a service that has demonstrated compliance with an applicable government regulation, such as Sarbanes-Oxley (SOX). Similarly, a service customer may require the use of a service that advertises compliance with a government or industry regulation in order to preserve their own organization's compliance, such as maintaining compliance with the Health Insurance Portability and Accountability Act. Additionally, a service that advertises comprehensive auditing may be considered a threat to the privacy of personal data by some consumers. If a user purchases a product from an online site, the user may prefer that no record of the transaction be retained in order to prevent the misuse of any stored information in a future targeted marketing scheme.

BRIEF SUMMARY OF THE INVENTION

A computer implemented method, a computer program product, and a data processing system use short messaging service for selecting a particular web service based on conformation to a particular degree-of-trust. Information about available web services is requested. Responsive to requesting information on a particular web service, a list of possible services is presented. The list of possible services includes a plurality of services, each of the plurality having a levels-of-trust assigned thereto. An acceptable web service having an acceptable degree-of-trust can then be selected from the list of possible services. Responsive to selecting the acceptable service from the list of possible services, the acceptable service can be invoked.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a data flow diagram of a typical authentication process that may be used when a client attempts to access a protected resource at a server according to an illustrative embodiment;

FIG. 4 is a data flow diagram for requesting a web service having a particular degree-of-trust according to an illustrative embodiment; and FIG. 5 is a flowchart for selecting web services from a catalogued service registry, wherein the web services have a desired degree-of-trust according to an illustrative embodiment.

DETAILED DESCRIPTION OF THE INVENTION

Figure 1:
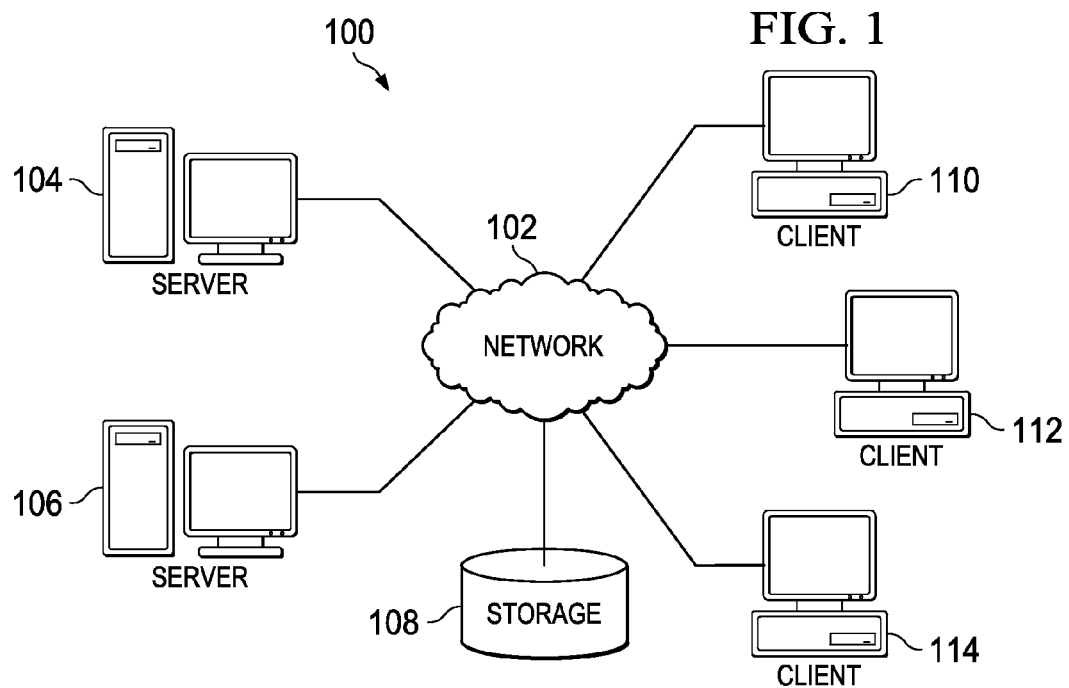
FIG. 1 depicts a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
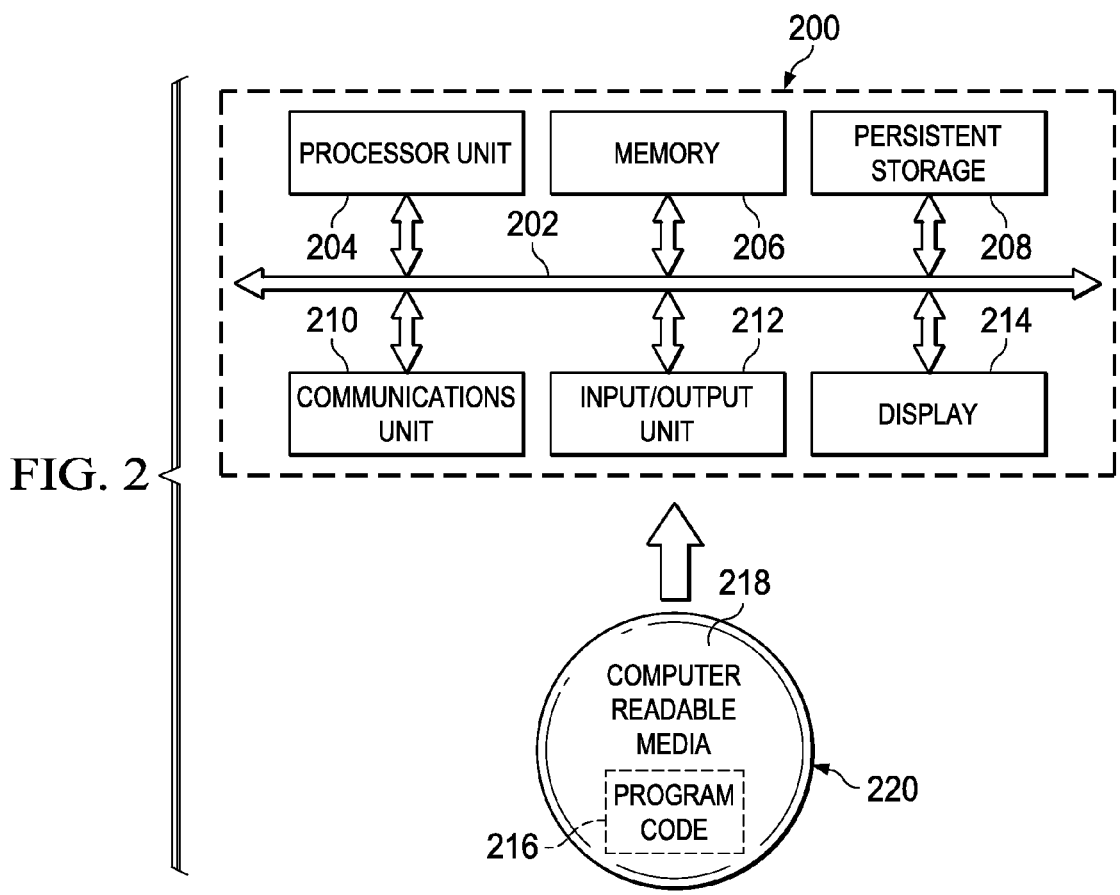
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

With reference now to FIG. 3, a data flow diagram illustrates a typical authentication process that may be used when a client attempts to access a protected resource at a server according to an illustrative embodiment. As illustrated, the user at client 310 seeks access over a computer network to a protected resource on web services server 312 through browser 314 executing on the client 310. A protected or controlled resource is a resource, such as for example, but not limited to, an application, an object, a document, a page, a file, executable code, or other computational resource, or communication-type resource, for which access is controlled or restricted. A protected resource is identified by a Uniform Resource Locator, or more generally, a Uniform Resource Identifier, that can only be accessed by an authenticated and/or authorized user. The computer network may be network 102 of FIG. 1. The server may be server 104 of FIG. 1.

A user of browser 314 at client 310 desires to access a protected resource on web services server 312 in domain name server domain 316. The terms "server-side" and "client-side" refer to actions or entities at a server or a client, respectively, within a networked environment. Browser 314, or associated application or applet, generates HTTP request 318 that is sent to web services server 312. The terms "request" and "response" should be understood to comprise data formatting that is appropriate for the transfer of information that is involved in a particular operation, such as messages, communication protocol information, or other associated information.

If client 310 does not have an active session with web services server 312, web services server 312 initiates and completes the establishment of a Secure Sockets Layer (SSL) session between web services server 312 and the client 310. Establishing a Secure Sockets Layer entails multiple transfers of information between client 310 and authentication server 320. After a Secure Sockets Layer session is established, subsequent communication messages are transferred within the Secure Sockets Layer session; any secret information remains secure because of the encrypted communication messages within the Secure Sockets Layer session.

Authentication server 320 determines the identity of client 310 before allowing client 310 to have access to protected resources on web services server 312. Authentication server 320 therefore requires client 310 to perform an authentication process by sending to client 310 authentication challenge 322. Authentication challenge 322 may be in various formats, such as an HTML form. Client 310 then provides authentication response 324, which can be the requested or required information, such as a username or other type of user identifier along with an associated password or other form of secret information.

Client 310 sends authentication response 324 to the server, at which point authentication server 320 authenticates client 310. Authentication server 320 can authenticate client 310 by retrieving previously submitted registration information and matching the presented authentication information within the authentication response 324 with the client 310's stored information. Assuming that the authentication is successful, an active session is established for client 310. Authentication server 320 creates session identifier 326 for the client, and sends session identifier 326 to client 310. Any subsequent request messages from client 310 within the session would be accompanied by the session identifier 326.

Web services server 312 then retrieves the originally requested web page and sends HTTP response message 328 to client 310, thereby fulfilling the user's original request for the protected resource. At that point, client 310 may request another page within domain name server domain 316 by clicking a hypertext link within browser 314. Web services server 312 recognizes that client 310 has an active session because session identifier 326 is returned by web services server 312 in the HTTP request message. Web services server 312 then sends the requested web page back to the client in another HTTP response message.

A user, application developer, or application during run time selects a web service to be implemented from a list of providers of the desired service. Web services are often catalogued in a service registry, such as WebSphere Service Registry and Repository, or a Universal Description Discovery and Integration directory. Service registries such as these allow service consumers to search for a service based on various attributes, and retrieve the service definition. The Web Services Definition Language is a standard for describing the interface of a web service.

In the illustrative embodiments herein, each entry in a service registry is also provided with an audit compliance policy that describes the policy constructs that are appropriate to the audit and compliance domain. By way of example, these constructs could include, but are not limited to, descriptions of which attributes of a transaction are included in the audit trail, descriptions of the levels of protection or encryption used to store audit data, descriptions of the type of, and length of, data retention that is employed, and descriptions of applicable government regulations which the specific web service is compliant with.

The audit compliance policy can be implemented as hierarchical levels-of-trust, that are implemented through the use of digital signatures. By way of non-limiting example, in one illustrative embodiment, a self-asserted, unsigned policy may have a low degree of trust. A policy signed by the organization publishing the web service may have a moderate degree of trust. A policy signed by a regulatory body or a known accreditation body of a particular compliance regulation may have a high degree of trust. For example, a statement of compliance signed by the US Federal Reserve or an official assessor of Payment Card Industry-Data Security Standards compliance might have a high degree of trust.

Thus, the illustrative embodiments provide a method of selecting a particular web service based on conformation to a particular set of audit and compliance attributes and degrees of trust in those attributes. Information about available web services is requested. Responsive to requesting information on a particular web service, a list of possible services is presented. The list of possible services includes a plurality of services, each of the plurality having a levels-of-trust assigned thereto. An acceptable web service having an acceptable degree-of-trust can then be selected from the list of possible services. Responsive to selecting the acceptable service from the list of possible services, the acceptable service can be invoked.

Referring now to FIG. 4, a data flow diagram for requesting a web service having a particular degree-of-trust is shown according to an illustrative embodiment.

Client 410 sends request 412 to service registry 414. Client 410 can be client 110 of FIG. 1. Request 412 is a request for a list of providers of the desired web service, and information about that particular web service. Service registry 414 is a catalogue of web services, such as WebSphere Service Registry and Repository, or a Universal Description Discovery and Integration directory. Service registry 414 can be maintained on a server, such as server 104 of FIG. 1.

Service registry 414 includes catalogue 416. Catalogue 416 is a data structure containing a list of available web services 418. Each of available web services 418 has a corresponding policy construct 420, any applicable digital signature 422, and degree-of-trust 424.

In one illustrative embodiment, a degree-of-trust is potentially a determination made by the client, based on the information obtained from the service registry. The business rules or algorithms that a client uses to decide on level of trust could vary from those employed by a different client. The various business rules and algorithms are more common case in an Internet environment, where a small business with low transaction volumes and no requirement to comply with a regulation may consider a self-asserted claim high degree of trust. Conversely, a large organization that is subject to compliance with government regulations such as Sarbanes-Oxley or Payment Card Industry-Data Security Standards may only consider a digital signature from an independent assessor to constitute a high degree of trust.

Policy construct 420 is a list of appropriate audit and compliance information for available web services 418. By way of example, policy construct 420 could include, but is not limited to, descriptions of which attributes of a transaction are included in the audit trail, descriptions of the levels of protection or encryption used to store audit data, descriptions of the type of, and length of, data retention that is employed, and descriptions of applicable government regulations which the specific web service is compliant with.

Digital signature 422 is the digital signature of any person, organization, regulatory body or a known accreditation body asserting the validity or compliance of policy construct 420. Degree-of-trust 424 is a hierarchical ranking system of each of web services 418, based on digital signature 422. By way of non-limiting example, in one illustrative embodiment, if digital signature 422 is a self-asserted, unsigned digital signature, degree-of-trust 424 may be "low". If digital signature 422 is a digital signature signed by the organization publishing the web service, degree-of-trust 424 may be "moderate". If digital signature 422 is a digital signature signed by a regulatory body or a known accreditation body of a particular compliance regulation, degree-of-trust 424 may be "high". For example, a statement of compliance signed by the US Federal Reserve or an official assessor or Payment Card Industry-Data Security Standards standards compliance might have a high degree of trust.

Responsive to receiving request 412, service registry 414 presents client 410 with catalogue 416, or some subset of the entries within catalogue 416. Client 410 can then select from those web services listed in catalogue 416 which match any desired policy construct 420, and wherein degree-of-trust 424 is acceptable to the user.

Referring now to FIG. 5, a flowchart for selecting web services from a catalogued service registry, wherein the web services have a desired degree-of-trust, is shown according to an illustrative embodiment. Process 500 is a software process, executing on a portal server, web application server or enterprise service bus software component, or a browser, such as browser 314 of FIG. 3, if process 500 occurs during run time.

Additionally, process 500 can execute on web development software, for use by a user or application developer, executing on client 310 of FIG. 3.

Process 500 begins by sending a request for web services to a service registry (step 510). The request can be request 412 of FIG. 4. The service registry can be service registry 414 of FIG. 4. The request for a web service can identify a policy construct that is desired by the user. By way of example, these constructs could include, but are not limited to, descriptions of which attributes of a transaction are included in the audit trail, descriptions of the levels of protection or encryption used to store audit data, descriptions of the type of, and length of, data retention that is employed, and descriptions of applicable government regulations which the specific web service is compliant with Responsive to sending the request for web services to a service registry, process 500 searches for a list of possible web services from the service registry (step 520). The list of possible web services can include any web service catalogued by the service registry that corresponds to a policy construct identified in the request.

Process 500 receives a list of possible web services from the service registry (step 530). The list of possible services includes a plurality of web services. Each of the plurality of web services having one of a plurality of levels-of-trust assigned thereto.

Process 500 makes a selection of an acceptable web service (step 540). The acceptable web service is one of the plurality of web services from the list of possible services, wherein the acceptable web service has an acceptable degree-of-trust.

Process 500 then forwards the selection of the acceptable web service to the service registry, and invokes the web service (step 550), with the process terminating thereafter. The web service is invoked in accordance with the data flow described in FIG. 3.

A user, application developer, or application during run time selects a web service to be implemented from a list of providers of the desired service. Web services are often catalogued in a service registry, such as WebSphere Service Registry and Repository, or a Universal Description Discovery and Integration directory. Service registries such as these allow service consumers to search for a service based on various attributes, and retrieve the service definition. The Web Services Definition Language is a standard for describing the interface of a web service.

In the illustrative embodiments herein, each entry in a service registry is also provided with an audit compliance policy that describes the policy constructs that are appropriate to the audit and compliance domain. By way of example, these constructs could include, but are not limited to, descriptions of which attributes of a transaction are included in the audit trail, descriptions of the levels of protection or encryption used to store audit data, descriptions of the type of, and length of, data retention that is employed, and descriptions of applicable government regulations which the specific web service is compliant with.

The audit compliance policy can be implemented as hierarchical levels-of-trust, that are implemented through the use of digital signatures. By way of non-limiting example, in one illustrative embodiment, a self-asserted, unsigned policy may have a low degree of trust. A policy signed by the organization publishing the web service may have a moderate degree of trust. A policy signed by a regulatory body or a known accreditation body of a particular compliance regulation may have a high degree of trust. For example, a statement of compliance signed by the US Federal Reserve or an official assessor or Payment Card Industry standards compliance might have a high degree of trust.

Thus, the illustrative embodiments provide a method of selecting a particular web service based on conformation to a particular degree of trust. Information about available web services is requested. Responsive to requesting information on a particular web service, a list of possible services is presented. The list of possible services includes a plurality of services, each of the plurality having a levels-of-trust assigned thereto. An acceptable web service having an acceptable degree-of-trust can then be selected from the list of possible services. Responsive to selecting the acceptable service from the list of possible services, the acceptable service can be invoked.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for selecting a particular web service, the method comprising:
   a computer requesting a web service from a service registry;
   responsive to requesting the web service, the computer receiving a list of possible web services from the service registry, wherein the list of possible services includes a plurality of web services, each of the plurality of web services having a one of a plurality of levels-of-trust assigned thereto, wherein each of the plurality of web services comprises a corresponding policy construct comprising descriptions of an applicable government regulation which the specific web service is compliant with, a description of which attributes of a transaction are included in an audit trail, descriptions of a level of protection used to store audit data, descriptions of a level of encryption used to store audit data, descriptions of the type of data retention that is employed, and descriptions of the length of data retention that is employed;
   the computer making a selection of an acceptable web service based on the corresponding policy construct, wherein the acceptable web service is one of the plurality of web services, wherein the acceptable web service has an acceptable degree-of-trust; and
   responsive to making the selection of the acceptable web service, the computer invoking the acceptable web service.

2. The computer implemented method of claim 1, further comprising:
   the computer receiving the list of possible web services from the service registry wherein each of the plurality of web services has a digital signature associated therewith, the digital signature being an assertion of the validity or compliance of the policy construct.

3. The computer implemented method of claim 2, further comprising:
   the computer receiving the list of possible web services from the service registry wherein each of the plurality of web services has the digital signature associated therewith, wherein the digital signature is selected from the list consisting of: a person's signature, an organization's signature, a regulatory body's signature, and a known accreditation body's signature.

4. The computer implemented method of claim 2, further comprising:
   the computer receiving a list of possible web services from the service registry, wherein the list of possible services includes a plurality of web services, each of the plurality of web services having a one of a plurality of levels-of-trust assigned thereto, and wherein the plurality of levels-of-trust are based on the digital signature associated with the web service.

5. The computer implemented method of claim 4, wherein the plurality of levels-of-trust is selected from a high degree-of-trust, a moderate degree-of-trust, and a low degree-of-trust.

6. A computer program product for selecting a particular web service, the computer program product comprising:
   a computer readable storage device having computer usable program code embodied therewith, the computer usable program code comprising:
   computer usable program code to request information about web services from a service registry;
   computer usable program code, responsive to requesting information about the web services, to receive a list of possible web service from the service registry, wherein the list of possible services includes a plurality of web services, each of the plurality of web services having a one of a plurality of levels-of-trust assigned thereto, wherein each of the plurality of web services comprises a corresponding policy construct comprising descriptions of an applicable government regulation which the specific web service is compliant with, a description of which attributes of a transaction are included in an audit trail, descriptions of a level of protection used to store audit data, descriptions of a level of encryption used to store audit data, descriptions of the type of data retention that is employed, and descriptions of the length of data retention that is employed;
   computer usable program code to make a selection of an acceptable web service based on the corresponding policy construct, wherein the acceptable web service is one of the plurality of web services, wherein the acceptable web service has an acceptable degree-of-trust; and computer usable program code, responsive to making the selection of the acceptable web service, to invoke the acceptable web service.

7. The computer program product of claim 6, wherein the computer usable program code embodied in the computer readable storage device further comprises:
computer usable program code to receive the list of possible web services from the service registry wherein each of the plurality of web services has a digital signature associated therewith, the digital signature being an assertion of the validity or compliance of the policy construct.

8. The computer program product of claim 7, wherein the computer usable program code embodied in the computer readable storage device further comprises:
computer usable program code to receive the list of possible web services from the service registry wherein each of the plurality of web services has the digital signature associated therewith, wherein the digital signature is selected from the list consisting of: a person's signature, an organization's signature, a regulatory body's signature, and a known accreditation body's signature.

9. The computer program product of claim 7, wherein the computer usable program code embodied in the computer readable storage device further comprises:
computer usable program code to receive a list of possible web services from the service registry, wherein the list of possible services includes a plurality of web services, each of the plurality of web services having a one of a plurality of levels-of-trust assigned thereto, and wherein the plurality of levels-of-trust are based on the digital signature associated with the web service.

10. The computer program product of claim 9, wherein the plurality of levels-of-trust is selected from a high degree-of-trust, a moderate degree-of-trust, and a low degree-of-trust.

11. A data processing system for selecting a particular web service, the data processing system comprising:
a bus;
a storage device connected to the bus, wherein the storage device contains a computer usable code; and
a processing unit connected to the bus, wherein the processing unit executes the computer usable program code to request information about web services from a service registry;
responsive to requesting information about the web service, to receive a list of possible web services from the service registry, wherein the list of possible services includes a plurality of web services, each of the plurality of web services having a one of a plurality of levels-of-trust assigned thereto, wherein each of the plurality of web services comprises a corresponding policy construct comprising descriptions of an applicable government regulation which the specific web service is compliant with, a description of which attributes of a transaction are included in an audit trail, descriptions of a level of protection used to store audit data, descriptions of a level of encryption used to store audit data, descriptions of the type of data retention that is employed, and descriptions of the length of data retention that is employed;
to make a selection of an acceptable web service based on the corresponding policy construct, wherein the acceptable web service is one of the plurality of web services, wherein the acceptable web service has an acceptable degree-of-trust; and
responsive to making the selection of the acceptable web service, to invoke the acceptable web service.

12. The data processing system of claim 11, wherein the processor unit further executes the computer usable program code to receive the list of possible web services from the service registry wherein each of the plurality of web services has a digital signature associated therewith, the digital signature being an assertion of the validity or compliance of the policy construct.

13. The data processing system of claim 12, wherein the processor unit further executes the computer usable program code to receive the list of possible web services from the service registry wherein each of the plurality of web services has the digital signature associated therewith, wherein the digital signature is selected from the list consisting of: a person's signature, an organization's signature, a regulatory body's signature, and a known accreditation body's signature.

14. The data processing system of claim 12, wherein the processor unit further executes the computer usable program code to receive a list of possible web services from the service registry, wherein the list of possible services includes a plurality of web services, each of the plurality of web services having a one of a plurality of levels-of-trust assigned thereto, and wherein the plurality of levels-of-trust are based on the digital signature associated with the web service.

15. The data processing system of claim 14, wherein the plurality of levels-of-trust is selected from a high degree-of-trust, a moderate degree-of-trust, and a low degree-of-trust.

* * * * *